Nov. 4, 1958   F. H. DENNISS   2,858,761
POPCORN MACHINE

Filed April 25, 1955   4 Sheets-Sheet 1

Inventor
FRANKLIN H. DENNISS
By~ Fetherstonhaugh & Co.
Attys

Nov. 4, 1958  F. H. DENNISS  2,858,761
POPCORN MACHINE
Filed April 25, 1955  4 Sheets-Sheet 2
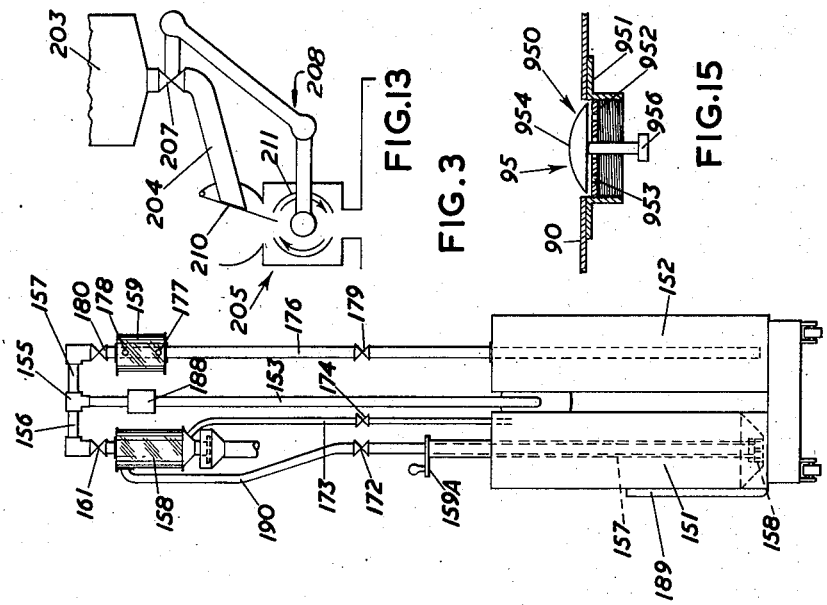
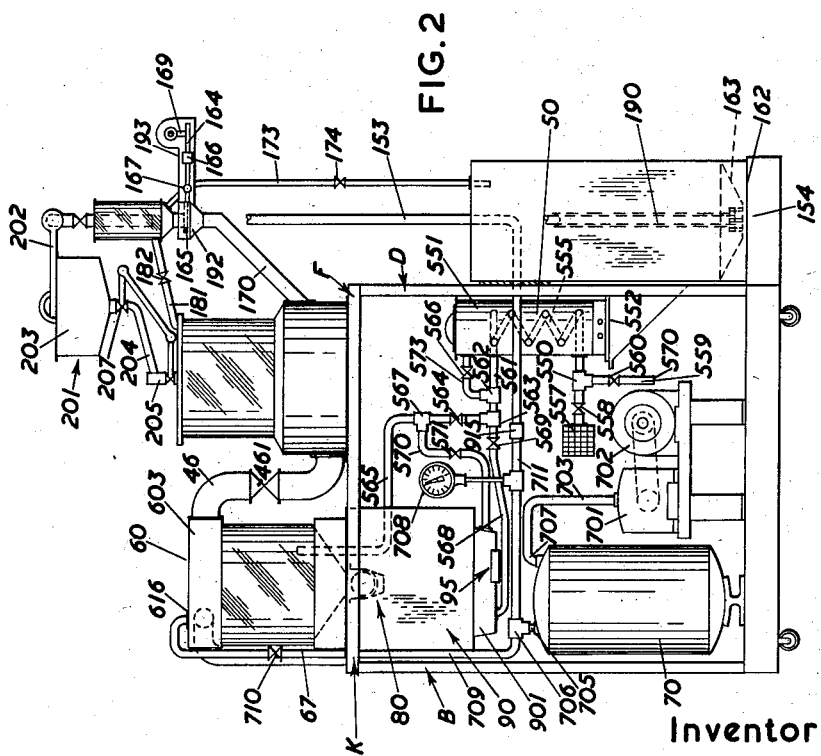
Inventor
FRANKLIN H. DENNISS
By Fetherstonhaugh & Co.
Attys

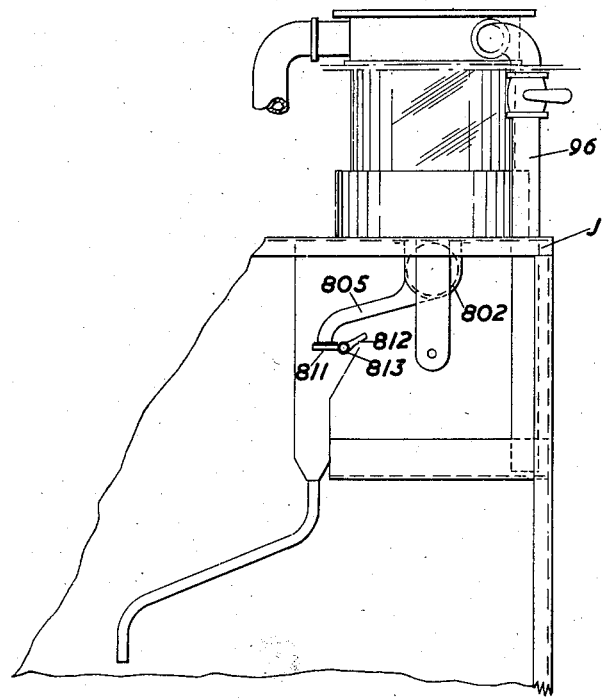
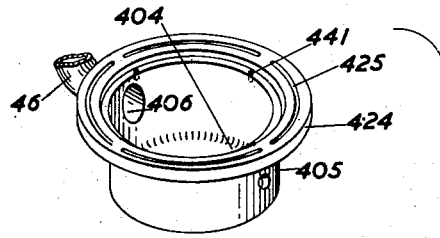
FIG. 4
FIG. 12
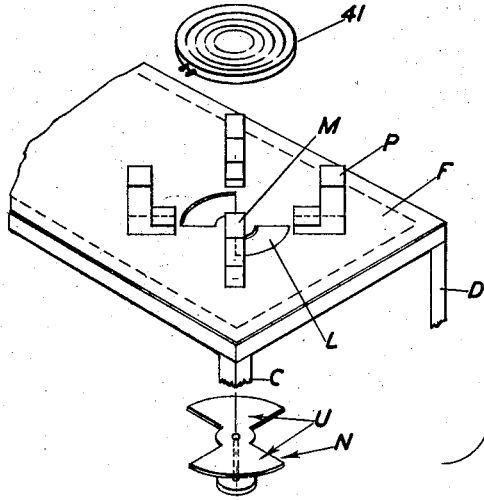
Inventor
FRANKLIN H. DENNISS

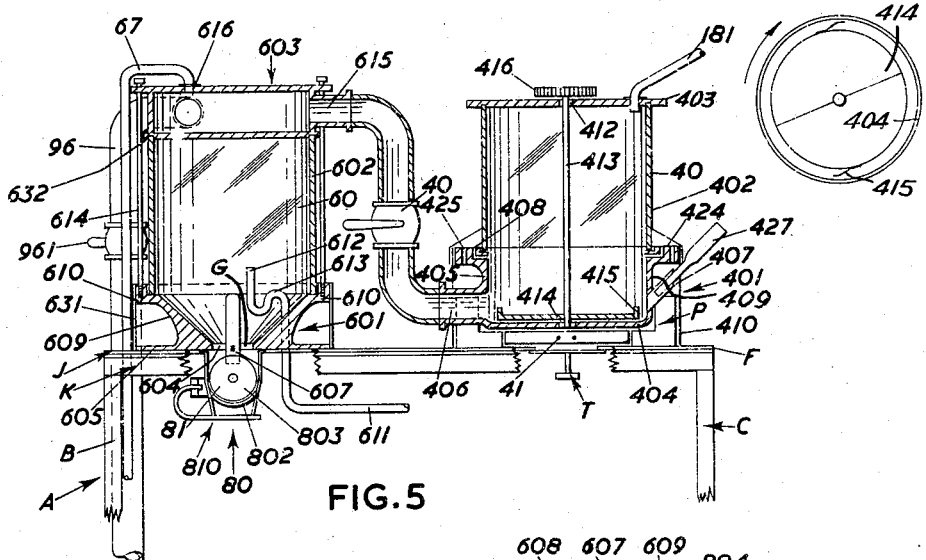
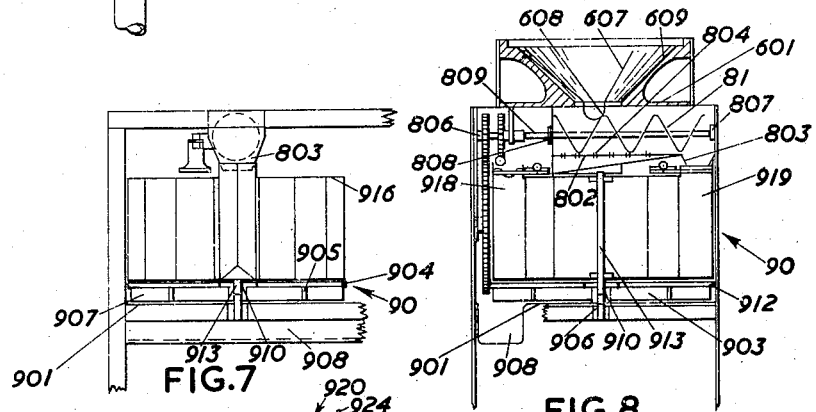
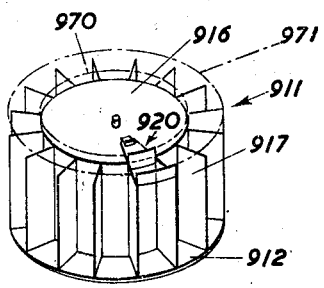
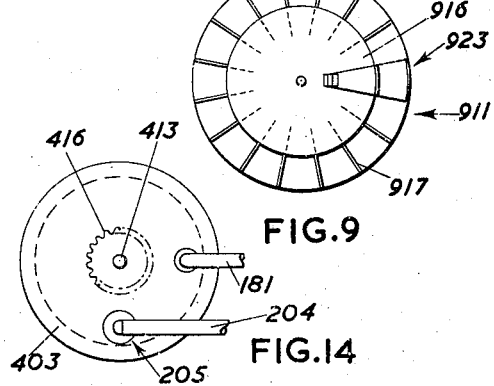

United States Patent Office 2,858,761
Patented Nov. 4, 1958

2,858,761

POPCORN MACHINE

Franklin H. Denniss, Strathroy, Ontario, Canada

Application April 25, 1955, Serial No. 503,613

1 Claim. (Cl. 99—238.7)

This invention relates to a method and means for making popcorn.

It is an object of this invention to provide a method and means for making popcorn in an atmosphere conducive to efficient popping.

It is an object of this invention to provide a method and means for converting the ingredients of saleable popcorn into a popcorn product in which a large proportion of the work of ingredient and product transfer is done by vacuum suction.

It is an object of this invention to provide a method and means for popping corn and a dispensing chamber for the popped corn and means for transferring the popped corn from the popping area to the dispensing chamber by means of vacuum suction.

It is an object of this invention to provide a method and means for transferring popped corn from a dispensing chamber to bags and means for transferring the bag overflow back into the dispensing chamber by vacuum suction.

It is an object of this invention to provide a popcorn producing means and method in which the popped corn is transferred into a dispensing area by vacuum suction and in which suction may also be used to draw water into the vacuum chamber to cleanse it.

By "vacuum-suction" I mean a pressure gradient produced by the evacuation of air to a desired degree.

There is herein disclosed a popping area which besides being heated to cause the corn to pop, has means for hot air ventilating the kernels while popping is going on. Such hot air ventilation has been found to improve the efficiency of popping and the quality of the finished product.

A dispensing chamber is provided adjacent the popper. In accord with an inventive idea here disclosed: means are provided for lowering the pressure in the dispensing chamber and the provision of necessary conduits and valves connecting popper and chamber allows the transfer of the corn by vacuum suction.

In a preferred embodiment of the invention means are provided for effecting the feed of popcorn ingredients (such as corn and oil) into the popper by the use of vacuum suction. Moreover, where bagging mechanism is provided, the bagging machine overflow is fed back for further bagging by suction. Suction is also used to draw or "splash" cleansing water into some of the components, providing easy and efficient cleaning of those components.

The invention will be illustrated in the accompanying drawings, in which:

Figure 2 is a side view of the popcorn machine.

Figure 3 is an end view of the ingredient feeding means (with substantially all the remainder of the machine omitted for clarity).

Figure 4 is a back view of a part of the cabinet.

Figure 5 is a vertical cross-section showing the popping and dispensing apparatus.

Figure 6 is a view of the popper stirring mechanism.

Figures 7 and 8 are cross-sections at right angles to one another showing the popcorn feeding and bagging means.

Figures 9, 10 and 11 are views of the bag holder.

Figure 12 is an exploded view of the popper pot mounting.

Figure 13 is an enlargement of a part of the ingredient feeding means.

Figure 14 is a top view of the popper cover.

Figure 15 is a view of part of the heating system.

Figure 1:
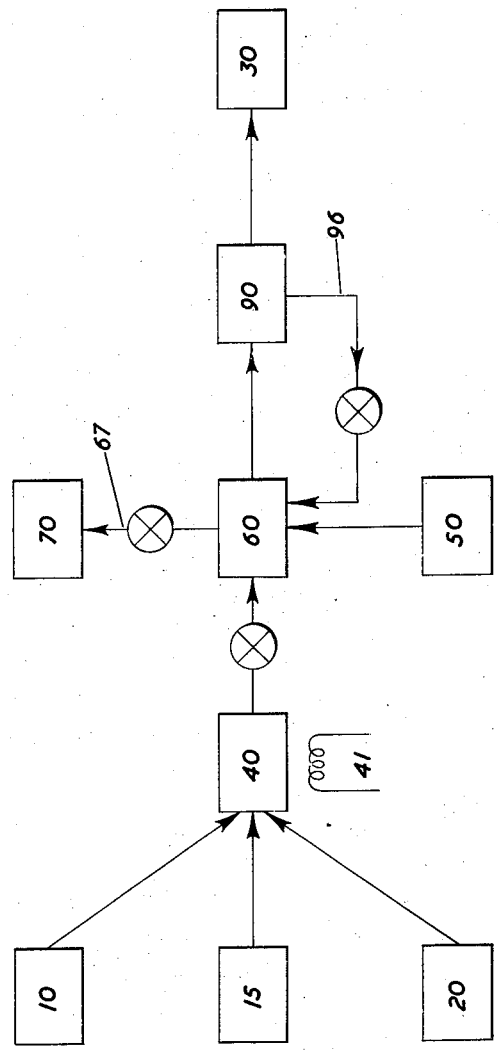
Figure 1 is a schematic diagram of the main operative parts of the popcorn machine.

Corn and oil and salt supplies 10, 15 and 20, respectively, are connected to popper 40 so that the corn and oil are fed by a combination of vacuum suction and gravity. The popper 40 obtains popping heat from coil 41 and is ventilated by hot air passing over the heater and into the popping area. A vacuum dispensing chamber 60 controlled by vacuum pump 70 is adapted to extract the corn from popper 40 under vacuum suction at desired intervals. From the vacuum chamber a mechanical feed supplies the popped popcorn to a bagger 90. Spillage from the bagger is vacuum-drawn back into dispensing chamber 60 through conduit 96. The corn in the vacuum chamber may be heated by a hot air supply 50.

*Cabinet*

A cabinet A supplies means for mounting the elements shown in Figure 1. The cabinet A is of rectangular angle iron construction having four uprights B, C, D and E bolted, welded, or otherwise securely fastened to a top F. Numerous cross-braces are supplied for further rigidity of the construction and for support of the various elements.

Top F (see Figure 12) is rectangular, being very roughly twice as long as it is wide. Its purpose is to support popper 40 and vacuum chamber 60 and the conduits and valves related thereto. As shown in Figure 5, a large aperture G allows popcorn to move under gravity from vacuum chamber 60 to mechanical feed means 80. Pins (not shown) projecting from the vacuum chamber casing seat in apertures in the top F to correctly orient and locate the vacuum chamber. A medium aperture J (see Figure 5) allows passage of the popcorn feed-back conduit 96, while a small aperture K allows passage of vacuum line 67.

Centering the other half of top F are apertures L which are segments of a circle centered at M. Pivotally mounted at center M and located just below top F is control plate N having segments U corresponding to apertures L and rotatable by a handle T to allow passage of the required amount of ventilating air.

L-shaped blocks P are suitably spaced about apertures L with the "L cross-arm" radially inwardly projecting to positively locate popper 40. The spacing provides room for the electrical popping element 41 which also acts to heat incoming air for ventilation of the popping corn.

Also located on the central legnthwise dividing line of the cabinet top are suitable apertures to allow passage of a safety valve line and a vacuum chamber pressure valve line, respectively.

For convenience, the construction as a whole will be described with reference to the orientation shown in Figure 2. The rear of the cabinet is below the sheet; the cabinet front is above; right and left of the cabinet are as shown in the figure; and upward and downward are as shown on the sheet.

The cabinet top F has a popper 40 and a vacuum dispensing chamber 60 seated on the right and left of the top F respectively.

Mounted on the cabinet A beneath top F is the hot air supply 50 while just below the popper base is the heating element 41.

Immediately below the dispensing chamber 60 is a mechanical dispensing means 80. On the left hand floor of the cabinet is the vacuum pump assembly 70.

If desired, a bagging compartment 90 may be mounted on the cabinet left, between the vacuum assembly 70 and dispensing means 80 and for cooperation with the latter.

Popper

It has been found that the most efficient popping is obtained if the popping space is hot air ventilated. It has been found that incomplete popping is obtained in a still atmosphere or with ventilation at summer temperatures. Accordingly, there is here provided a popping space in which the kernels are not only heated for popping purposes but are also hot air ventilated during popping.

Popper 40 (Figures 4 and 5) is constructed of a cast base 401, glass cylinder 402 and lid 403, which lid is rigidly connected to the base 401 by any convenient means.

Base 401 is preferably made of cast aluminum and is of flat hollow cylindrical shape defined by a bottom 404 and side walls 405. The upper extremity of the side wall 405 projects outwardly to form an annular flange 424 apertured by vertical arcuate slots 425. Projecting laterally from said casting is popcorn outlet port 406 suitably flanged, the base 401 being oriented so that port 406 projects toward vacuum chamber 60. The port 406 allows connection to the vacuum chamber 60 through conduit 46. Conduit 46 connects popper 40 and vacum chamber 60. The conduit is wide enough to pass the popcorn and is provided with curved bends and a continuous smooth inner surface to avoid damage to the popcorn travelling therethrough and to avoid clogging of the popcorn in the passage. A kernel inlet spout 407 projects diagonally upwardly from the casting and generally toward the adjacent end of the cabinet. The base 401 is seated in L-shaped blocks P and located thereby, although it may be conveniently rotated for proper alignment with conduit 46.

Annular flange 424 is stepped down toward the inside wall of base 401 to seat a convenient number of L-shaped spacers 408. The L-shaped spacers 408 provide a ventilation inlet to cylinder 402 and the spacers 408 are removably keyed as shown at 441 to base 401 for convenience in setting up the machine. For protection of the glass cylinder 402, its bottom edge and possibly the lower contact surfaces, may be suitably edged by protective metal sheathing.

The base 401 including flange 404 and the lowest extent of the cylinder 409 are encompassed by metal sheathing 410 having vertical cylindrical walls to the top of flange 404 and then sloped upwardly and inwardly to contact the glass cylinder 402 wall forming a "shanty roof." Sheathing 410, of course, closes off the upward path of the ventilating air forcing it into the popper between the ventilating spacers.

Sheathing 410 is suitably apertured to allow projection of conduit 46 from the port 406 and to allow insertion of a conduit 427 running to kernel spout 407. The top end of the glass cylinder 402 is closed by a metal cover 403 having a central aperture 412, said cover fitting the cylinder edge as shown, or by any convenient means. Such closure should be reasonably complete but need not be absolutely air tight.

Pivotally mounted on cover 403 is a stirring rod 413 adapted to project downwardly through the cover aperture 412 to guide bearing 414 on the floor of base 401. Chimney valve 205 forms the hot air outlet for popper 40 (see Figure 14).

Mounted on the stirring rod 413 adjacent the floor of base 401 are stirring paddles 415. The stirring paddle is of a generally round wire construction and of a diameter smaller than the casting diameter by an amount sufficient to leave an annular zone around the outer diameter of the disc which is known as the "bud zone," i. e. a relatively low heat zone where incomplete popping of the kernels will take place. To sweep out of this zone, inwardly directed paddles 415 are located on and project outwardly from the periphery of the disc of paddle 415.

The operation of the stirring rod and paddle may be manual, may be by vacuum operated turbine or electric motor mounted on cover 411 and connected to gear wheel 416.

If heat expansion differential between the glass cylinder 402 and the metal members joined thereto causes cracking of the glass, Pyrex may advantageously be used instead, and it is believed in general that Pyrex should be used.

Chimney valve 205 is also mounted on the cover 411. The valve when opened allows the egress of ventilating air from the popping chamber and if an automatic salt feed is used, allows ingress of the flavouring salt (compare with valve 205). Without the automatic feed, salt is added manually.

Popper operation

Heat for popping the corn is supplied by heater element 41. If the corn and oil are added manually they are poured in through kernal inlet spout 407. Under the vacuum feed to be discussed hereafter, the corn still comes in through the inlet spout but the oil has its own inlet conduit 181. Salt is added automatically through a valve such as 205, or manually. With the heat on and the popcorn in position, segments U are adjusted for the desired amount of air flow. The air flowing through the apertures L is heated by the element 41 and passes outwardly between sheathing 410 and side wall 405 and through the spaces provided by spacers 408 and into the pot to ventilate the popcorn therein.

Vacuum or dispensing chamber

The vacuum chamber 60 receives popped corn from the popper 40 and dispenses it for merchandising. It is conduit connected to the popper and means are provided for creating the desired degree of vacuum therein. Accordingly, with a vacuum in the vacuum chamber, the opening of the connecting conduit 46 from the popper will suck any popcorn in the popper into the vacuum chamber.

An open ended conduit enters the lower portion of the chamber and is upwardly directed. Hot air may be supplied through this conduit to heat the popcorn in the chamber. Alternatively, to wash the chamber a vacuum is produced therein and a water supply is connected to the other end of the conduit which is suddenly opened to the vacuum, causing the water to "splash-wash" the chamber (and the dispensing mechanism, to be discussed hereafter).

The vacuum or dispensing chamber 60 comprises a base 601, a glass cylinder body 602, and top member 603. Base 601 and top 603 are preferably aluminum castings.

Base 601 is centrally apertured at 604 to allow transfer of popcorn from the vacuum chamber 60 to the worm gear 81. Horizontally extending outwardly from the aperture is circular base 605. Conical walls 609 extending upwardly and outwardly from around the aperture 604 provide a hopper bottom sloped toward the aperture 604 to guide popcorn under gravity thereto. Part way up conical walls 609 is anchored a narrow leaf spring 607 (see Figure 8). The spring runs down adjacent the sloping hopper bottom toward the aperture 604 and then upwardly away from the aperture. The extent of the leaf spring overlying aperture 604 is formed into a U-shaped projection 608 extending downwardly through the aperture. Here it periodically makes contact with the mechanical feeding means 81 to be oscillated thereby and to agitate and prevent clogging of the popcorn.

The base 601 is vertically apertured to provide an ingress for the water and hot air conduit 611 which is provided with a vertically upwardly directed open end 612 located near the axis of the chamber 60, and which conduit 611 is provided with an S popcorn trap 613.

Means are also provided on the bottom of base 601, adjacent aperture 604, for attachment of the feeding means 80. The base member may, if desired, be covered by vertical cylindrical sheathing 631.

The inner surface of conical walls 609 adjacent their upper extremity is horizontally and vertically cut to provide an annular shelf 610. Seated on this annular shelf 610 is the lower edge of glass cylinder 602 forming the body of the vacuum chamber. Interposed between the cylinder edge and the shelf 610 is a suitable sealing gasket (not shown).

The top member 603 is in the form of a flat hollow cylinder and is preferably also of cast aluminum and has on its lower surface an annular groove 632 to receive the upper edge of glass cylinder 602. Here also is a suitable gasket (not shown) to provide a vacuum seal. The upper edge of top 603 is flanged outwardly to correspond with the outer extremity of conical walls 609. Therefore, rods 614 extending between said outward flanging and said conical wall extremity, may be threaded through holes in the upper member into topped holes in base 601 and tightened as desired, to vacuum-seal cylinders 602 and 603 in position.

The top 603 is cast with side apertures 615 to receive the popcorn conduit 46 and with a top aperture 617 for the popcorn feedback conduit 96. Vacuum port 616 screened to prevent the passage of popcorn may be either located in the side or upper part of top 603 and this port is, of course, for connection to the vacuum conduit 67.

The operations taking place in vacuum chamber 60 will be discussed after the description of the vacuum circuit.

*Dispenser and bagger*

Mechanical dispensing means 80 comprises a housing 802 mounted on the bottom surface of base 601 and a worm gear 81 extending from beneath aperture 604 toward the front of the cabinet, see Figures 4 and 8. At the front end of the housing is a dispensing spout 803.

The floor of worm housing 802 is apertured as at 804 to allow kernels and waste to drop out of the popcorn travelling down the housing. The apertures 804 are, of course, too small to pass or impede full blown popcorn in its travel. Beneath apertures 804 is a slanting floored channel leading to a waste spout 805 (see Figure 4).

Because the mechanical feeding means is directly open to the vacuum chamber, worm gear housing must enclose the worm gear in an air tight space. The housing accordingly has suitable sealing gaskets interposed between it and the base 601. The worm gear shaft 809 projects from the housing to the rear of the aperture 604 to seat in suitable bearings 806 on the cabinet bracing, the other end of the shaft resting on bearings 807. Accordingly, bearing 808 where the shaft 809 goes through the rear wall of the housing 802 is graphite packed and vacuum tight.

Dispensing spout 803 is provided with a vertically pivoted cover 810 which is somewhat loosely mounted but is pulled up to tight sealing position by a vacuum in the vacuum chamber 60.

Waste spout 805 (see Figure 4) is closed under vacuum by the upward pull on flap 811 of balance valve 812 which is pivotally mounted at 813.

In case it is required, an automatic bagger means 90 is provided beneath vacuum chamber 60.

A convenient distance beneath the left half of top F is the bagging compartment floor 901 extending half the length of the cabinet from the front to a rearwardly disposed overflow channel 908 running the length of the compartment.

Centrally located on floor 901 is a bearing recess 906 adapted to receive the stub axle of a turntable 903.

Turntable 903 has a circular surface 904 with a diameter just less than the minimum horizontal dimension of compartment 90. Projecting downwardly from surface 904 is an annular flange 905 which may contact floor 901 and at any rate approaches sufficiently close to floor 901 to prevent the passage of popcorn thereunder. Radially projecting from flange 905 and of the same downward extent are a convenient number of sweep flanges 907 which are adapted to sweep popcorn which misses the bags into overflow channel 908.

Turntable 903 is provided with an axial recess 910 on its upper side for receipt of the bag carrier axle.

The bag carrier 911 has roughly the same diameter as the turntable 903, is being borne in mind that the governing principle is that the carried bags must pass directly under dispensing spout 803.

Bag carrier 911 has a circular floor 912 and an axle 913 projecting therethrough with its lower stud adapted to fit in bearing 910. Recess 910 and axle 913 may be provided with cooperative keying means if more positive rotation of the bag carrier is required.

Axle 913 extends upwardly from floor 912 a distance approximately equal to the height of the bags used.

Rigidly mounted adjacent the top end is a second disc 916. Disc 916 is of smaller radius than floor 912 by a distance equal to the longer horizontal dimension of the bag used and the vertical spacing between these two elements is just less than the height of such a bag. Vertical radial partition walls 917 extending between the floor 912 and disc 916 divide the cylindrical space outside disc 916 and above floor 912 into a desired number of bag compartments (here sixteen).

The bags selected, therefore, have a length approximately equal to the length of projection of a partition 917 beyond disc 916 and a width approximately equal to the arcuate length along floor 912 between adjacent partitions 917. The bag, therefore, when placed in a compartment with its long side parallel to the partitions 917 is slightly "crimped" at the inner end.

It will be noted that conventional gusset bags have one of the long sides 918 cut away at the top of the bag so that (with conventional manual opening) the other long side 919 (compare left and right hand sides of Figure 8) may be grasped for opening. This bag construction is utilized in filling the popcorn bags and consequently each bag is placed with the sides 919 trailing in the direction of rotation and the cut away sides 918 leading.

Pivotally mounted on the top of disc 916 at 921 are wire holders 920 for each of the bag compartments (only one is shown). Each bag holder carries a wire frame 923 shaped framing the outline of the bag compartment and overlying it. Just radially outward of disc 916 is a vertical plate 922 extending above and below the wire while on the peripheral wire is a similar upwardly extending plate 924.

With a bag in place in a compartment the pivoted holder 920 is lowered into position.

Plate 922 acts to "pinch" the inner side of the bag against the edge of disc 916 and to hold it in position while the upper part of plate 922 and plate 924 steady the inner and outer bag walls.

The bag carrier, loaded with bags and with holders 920 in position, is placed on the turntable 903.

As previously stated, the diameter of the carrier is such that the bags come under dispensing spout 803. The height of the turntable and bag carrier is such that the long sides 919 of the bag tops, projecting above the wire frames, contact the spout, hinged cover 810 having swung clear thereof. As the bag carrier rotates, therefore, the spout continually pours corn into the passing bags which rotate until the bags are filled or the popcorn is exhausted. The spout contacts each of the long sides pulling it over the wire frame and partition before releasing it and filling the next bag. Moreover, plates 922 and 924 form a channel extending around the bag-carrier (indicated by lines 970—971). Thus, spillage between adjacent bags does not take place or at least is minimized.

In operation the turntable 903 is continuously driven by the worm gear drive and the bags pass under the spout 803. Corn falls through the hopper bottom of vacuum chamber 60 under gravity, assisted by the agitation of leaf spring projection 607 which is under the actuation of worm gear 81. The corn falling into the housing 802 is carried along by worm gear 81 to fall out of spout 803 into the bags. It will be noted that under this system the popcorn contents of the vacuum chamber should be greater or equal to the volume of the bags in the turntable 903. If the popcorn volume is less, all the bags will only be partly full.

It is, of course, possible to substitute an intermittent bag filler which will fill the individual bags in turn. Such an intermittent filler will be considerably more expensive than the means shown and will be no more convenient if the popping batches are calculated. Some guidance to the ingredients of a sixteen bag batch will be later described.

Conduit 96 provided with control valve 961 projects downwardly with its lower end open over the overflow channel 908.

Manual bagging may, of course, be used if desired and the mechanical bagger will thus be dispensed with.

Corn, oil and salt feed assemblies

There are here described individual vacuum operable means for supplying corn and oil and also described means for simultaneously supplying and measuring salt for the popper pot. Any of the three ingredients may, of course, be supplied manually.

The corn and oil are supplied from twin tanks 151 and 152 removably attached to the popper end of the cabinet A. Vertically disposed therefrom are corn and oil measuring units which feed into the popper pot by gravity. If automatic salt feed is used, a salt cylinder 201 should be mounted above the popper pot top to feed into the popper under gravity.

The vacuum control for the corn and oil feed utilizes the vacuum pump 70 and a vacuum line 153 to the corn and oil feed connects to a vacuum circuit. Vacuum line 153 runs horizontally to the large end flange on cabinet A vertically between the tanks 151 and 152 to a T-joint (not shown).

The upper extremity of vertical line 153 terminates in a T-joint 155. Located just below T-joint 155 is a T-flange 188 in case a vacuum stirring motor is used. Horizontally projecting from each side of the joint 155 are vacuum conduits 156 and 157 which turn through a right angle and project vertically downward over corn tank 151 and oil tank 152.

Conduits 156 and 157 connect respectively into the tops of vacuum-tight corn and oil measuring cylinders 158 and 159 to control the raising of the ingredients. Structure 1 support means (not shown) are provided for support of the line 153 and all apparatus attached thereto.

Dealing first with the corn feeding means; tank 151 is of generally vertical rectangular form rigidly fastened to the side of the main cabinet as shown in Figure 2. The tank 151 is provided with a double bottom, the lower floor 162 being flat while spaced upwardly therefrom is a hopper-shaped bottom 163 having a central horizontal area 154. An air inlet 155 is provided in the tank walls between floor 162 and bottom 163 leading to an upwardly open conduit 189 and holes small compared to the corn kernel size (not shown) are provided in horizontal area 154.

A corn take-up pipe 190 extends downwardly into the centre of tank 151 to a short distance above the hopper floor, sufficient to allow passage of kernels along the floor under the take-up pipe. A kernel agitating mechanism is provided, comprising a tubular rod 157 concentric with and surrounding the pipe 190 which acts as a bearing, and supported on the hopper floor by four spaced posts 158 attached to the lower tube extremity. The tubular rod projects out of the tank to a stirring handle 159A. The handle 159A is rotated to provide manual agitation of the corn, preventing corn clogging and allowing free air passage. Air inlets (not shown) are provided at the top of the corn tank, (about the stirring tube if desired) to allow ingress of air when the corn is being sucked up take-up pipe 190 under vacuum. Thus, when vacuum is applied in pipe 190 a straight upflow of air through hopper floor apertures 154 is provided, tending to carry the kernels with it. If further air ingress is required, further holes may be provided into the tank just above the hopper opening.

Measuring cylinder 158 is airtight, glass walled with a flat top and a funnel bottom. Conduit 156 connects to the cylinder through the flat top and air passage between conduit and cylinder is controlled by valve 161. The cylinder opening of conduit 156 is closely screened to prevent the reception of corn in the vacuum system.

Take-up pipe 190 runs upward from tank 151 to connect with the upper end of the corn measuring cylinder 158. Air and corn passage therethrough is controlled by manual valve 172. The funnel outlet of measuring cylinder 158 leads out to a hopper 192. Located in a horizontal adjunct 193 to the hopper is a scale arm 164 which has an end adapted to form a flap valve 165 for the funnel opening into hopper 192, an end mounting an adjustable balance weight 166, and an intermediate pivotal mounting 167. When vacuum is applied to the measuring cylinder 158, therefore, valve 165 closes under the suction and prevents air entrance. Weight 166 is adjustable to measure the corn in the cylinder 158. The criterion of the corn amount is the quantity to be bagged at one time. This must be ascertained for weight adjustment and determines the location of weight 166.

The weighted end of scale arm 164 is normally allowed a very narrow angular swing, sufficient to indicate the existence of the desired weight of corn in the cylinder 158, but insufficient to allow the escape of corn to the hopper 192. The upward movement of the weighted end of scale arm 164 is limited by lug 169 which is spring loaded into its limiting position. However, a manually operable plunger (not shown) is provided to move lug 169 out of range of the scale arm swing. The scale arm may then be raised to allow the corn to pour into the hopper 192. Hopper 192 connects to the popper pot through connecting detachable conduit 170 as shown. For draining excess corn, i. e. corn over the weight limit, from cylinder to tank, conduit 173 is provided leading from the bottom of cylinder 158 to the top of tank 151. Corn passage through this line is controlled by manual valve 174.

Oil tank 152 has an oil take-up pipe 176 extending almost to the bottom thereof so as to be able to nearly drain the tank under suction. Located vertically upward from the oil tank 152 is a glass measuring cylinder 159. Oil take-up pipe 176 is continued upwardly through measuring cylinder 159 to become conduit 157. Inside cylinder 159 the pipe is apertured at 177 near the bottom of the cylinder and apertured at 178 near the top of the cylinder. Hole 177 allows oil to enter the cylinder, hole 178 allows evacuation of the air from the cylinder when the aperture 177 is covered up by oil.

Travel from the oil tank 152 to measuring cylinder 159 is controlled by manual valve 179. Vacuum suction from the oil cylinder 159 to the vacuum line is controlled by manual valve 180.

Conduit 181 connects the bottom of cylinder 159 with the top of the popper pot 40 for travel of the oil from the cylinder 159 to the pot 40. To control this oil valve manual control valve 182 is provided. Cylinders 156 and 159 are each provided with gauge marks which indicate the desired amount of popcorn or oil respectively.

If automatic salt feed is used the sale assembly 201 is preferably suspended over the popper pot 40 by arms 202 projecting from vacuum conduits 156 and 157. The assembly may be pivotally mounted to allow removal of the sale assembly 201 from the popper pot area when it becomes necessary to clean the popper pot.

The assembly 201 comprises a salt pot 203 connected by a conduit 204 to entrance hopper 205 in the top of the popper pot. A manual valve 206 in the hopper opening controls salt passage from the hopper 205 into the pot 40.

A valve 207 controls passage from the salt pot 203 to the conduit 204. Valves 205 and 207 are connected by a mechanical linkage 208 and are so arranged that when one is open the other is closed. Conduit 204 between the valves is the salt measuring container. The length of conduit 204 between valves 206 and 207 controls the amount of salt to be supplied to the popper pot in one cycle of operation of the mechanical linkage 208. Thus, when valve 207 is open, salt pours into conduit 204 and fills it being retained in conduit 204 by a gravity operated pivoted valve 210 (see Figure 13) which is gravity actuated to close the conduit and extends downward into the housing of valve 205. Valve 205 is rotary and provided with two cylindrical plates 211 which on a quarter turn clockwise of the plates from the position shown in Figure 13 operate to close the chimney valve. Such a quarter turn brings one of the plates 211 into contact with the valve 210 to clamp it closed on conduit 404 while the linkage 208 opens valve 207 filling the conduit with salt. When chimney valve 205 is opened, the valve 210 is released allowing salt to pour into the popper 40 while the linkage closes valve 207 to cut off further supply of salt at the measured quantity. When popping is going on, the chimney valve 205 is open, but the weight of valve 210 keeps conduit 204 closed and prevents moisture reaching the salt supply.

Vacuum circuit

Vacuum pump 701 and motor 702 are rigidly mounted on the cabinet floor. The motor and pump combination must be suitable to produce roughly between 1" and 10" of vacuum in the vacuum chamber. A suitable pump for this operation may be operated with a ¼ horse-power motor. Pump 701 is connected by conduit 703 to the upper end of vacuum tank 70 which is also rigidly mounted on the cabinet A. An open conduit 705 projects downwardly for about six inches. This projection lessens the probability that any waste caught up in the vacuum line will get into pump conduit 703. The waste tends rather to fall to the bottom of the tank.

Conduit 705 connects to a three-way joint 706, a conduit 707 leading therefrom to a vacuum gauge 708 and safety valve 715. The third conduit 709 connects to vacuum chamber 60 through port 616 in the upper casting 603.

To control the vacuum pump connection to the chamber, a manually operable control valve 710 is located on conduit 709 at a position convenient for the operator. The vacuum port 616 should be screened to prevent popcorn being drawn into the vacuum line and vacuum tank and consequent damage.

It will be noted that vacuum gauge 708 will read the vacuum in vacuum chamber 60 when the valve 710 is open.

If vacuum feed for corn and oil is used, a feed conduit 711 connects to vacuum line 153 through a large end flange securely bolted to the end of cabinet A on the inside. The flange thus supplies structural support for lines 153 and 711.

Just below joint 155 is provided a valve controlled outlet 191 for connection with the vacuum stirring system if and when used.

Heating system

Referring to Figure 5, it will be seen that the popping heating is supplied by an electric element 41 located between the cabinet top F and the popper base 401 in the vertical space provided by blocks P. The element 41 is supplied from a suitable electrical source. The power requirements will be discussed later in connection with the system as a whole.

To provide efficient popping the kernels must be hot air ventilated. Therefore, incoming air through apertures M at a rate controlled by plate N, is heated in passing over the element 41.

The heated air is deflected outwardly and radially by popper pot base 401 between L-shaped blocks P, where metal sheathing 410 guides it upwardly through arcuate slots 425 then downwardly and into the pot between cylinder 402 and base 401 through the space provided by L-shaped spacers 408.

The hot air, therefore, passes out of the popper 40 through the chimney valve.

In Figure 2 is shown hot air supply 50. The supply comprises an insulated water tank 551 suitably mounted on cabinet cross-braces S. Mounted below the tank is a "heat maintaining" heating element 552. Preferably the tank is filled with hot water from a suitable hot water source and the element 552 merely maintains the hot water temperature.

At the top and bottom of the tank are a suitable water inlet port and an outlet faucet (not shown). Mounted in the tank 551 is an air heating conduit 555 coiled to provide the maximum heat absorbing surface. (This may be helically as shown in the drawings, or in suitable S-curves.)

The lower inlet of conduit 555 is brought out of the tank 551 and connects to air inlet 556 through air filter 557, hand control valve 558 and three-way joint 550.

Means are also supplied for running cleaning water through the conduit 555 comprising a downwardly projecting inlet pipe 570 equipped with manual control valve 560 connected to the third orifice of three-way joint 550.

The heated air leaves tank 551 and is connected to the vacuum chamber 60 by the path generally indicated as 56. This path comprises conduit 561, three-way joints 562 and 563, valve 564, and joint 567, then through conduit 565 to the hot air line 611 in the vacuum chamber for heating the corn.

The third orifice of joint 562 is the inlet for conduit 573 connecting to the top of tank 551 through manual control valve 566. This bypass allows the introduction of moisture into the hot air system in case the corn in the vacuum chamber 60 has become dried out.

Joints 563 and 567 provide a bypass around main valve 564 for heating the bagging compartment. Leading from joint 563 is conduit 568 controlled by valve 569 while leading into joint 567 is conduit 570 controlled by needle valve 571. Air passing from line 561 through valve 569, lines 568 and 570 and back to line 567 operates to pass heat through the heating area 572 below the bagging compartment.

In Figure 15 is shown a safety valve for the heating compartment 901. If valve 571 is open when vacuum is applied in conduit 565, the suction may collapse compartment 901 which requires the provision for a valve 95 in the floor thereof. Valve 95 comprises a sleeve 951 bolted to the floor to correspond with aperture 950 in the bagging compartment 901. Threaded in sleeve 951 is a stopper 952 with a central aperture and spaced radial apertures 953. Valve 95 is formed with a head 954 and a stem 956. The head 954 normally closes aperture 953 and the central aperture through which valve stem 96 projects. Gravity normally causes the head of valve 954 to close apertures 953 and by manual operation allows release of wash water and dirt. When a vacuum is accidentally developed in bagging compartment 901, valve 954 automatically opens to relieve the vacuum.

Operation

To add the desired ingredients to the popper pot, the corn, oil and salt may, of course, be added manually. If not, the vacuum is applied to measuring cylinders 158 and 159 by the operation of valves 161 and 180 respectively, in combination with valve 155.

To raise the kernels, a strong sweep of air is required and ten inches of vacuum should be developed in corn measuring cylinder 158. Valve 172 is then opened and the kernels are swept up into measuring cylinder 158 up to the desired measurement. If insufficient corn is pulled up the operation may be repeated. If too much, this may be let back into the corn tank by opening valve 174.

Similarly, to raise oil into measuring cylinder, valve 180 is operated to create a vacuum there. By opening valve 179 oil is sucked up into the measuring cylinder. However, when the oil is released by valve 182 for drainage into the cylinder the oil must be assisted in its flow by air let into cylinder 159. Accordingly, valve 180 is provided with an air inlet (not shown) which is closed when valve 180 is open to allow the development of a vacuum in cylinder 159, but which allows the ingress of air to cylinder 159 when the vacuum connection is closed.

By releasing lug 169, corn will fall under gravity through the hopper bottom and down conduit 170 into popper 40. Oil is similarly added through conduit 181 by opening valve 182.

Salt is added from hopper 203 by first closing chimney valve 205 for the popcorn transfer by operating the linkage and simultaneously opening valve 207, filling conduit 204 with salt. The opening of chimney valve 205 closes the valve 207 and cuts off the hopper supply but releases the salt in conduit 204 into popper 40.

While stirring rod 413 is operated to mix the ingredients, element 41 applies popping heat to the corn in the popper. Air heated by element 41 also passes up around the pot sheathing and into the pot to hot air ventilate the popcorn and the corn is thus efficiently popped.

Always, while popping is in progress, whether for a few batches or in sustained periods of hours, valves 571 and 564 are closed and remain so. Valve 961 used only for spillage ditch transfers from 908, Figure 8, is therefore always closed, except at convenient intervals for that purpose. Valve 569 is now neutral and it does not matter whether it is open or closed. Valve 811, Figure 4, is always completely automatic whether used for popping, heating or washing. Valve 810, Figure 5, may or may not close automatically when the vacuum is turned on in container 60. If not then all it needs is a little lift up and it will instantly seal the dispensing spout 803, even if there is only an influence of vacuum at that point. There are now only two valves left to operate, namely 710 and 461. Now open 461 wide and leave it that way. Valve 710 is therefore the only valve left to operate for a single popcorn transfer or a day's operation. When the batch is ready to transfer, note the vacuum gauge reading. If it is about three inches, less care will be needed, but if the reading is ten inches, then open valve 710 slightly, just enough to start the popcorn moving, increasing the opening slightly if necessary, so as to complete the operation in about fifteen seconds.

The only cause for trouble here is high vacuum and too much or quick valve 710 operation. The popcorn is very likely then to jam at the pot entrance of channel 406, Figure 5. Once inside there it will continue moving. To break up such congestion, wheel 416 on shaft 413, Figure 5, shown with the turbine construction is used. If the turbine is unable to break up any of such congestion, then the operator can turn the wheel 416, and that is its only purpose. While the turbine is working, the handle is always turning. When it stops the operator will notice at once and know that the turbine is jammed.

When it is necessary to clean the pot of corn kernels, hulls and broken particles of popcorn reverse the operation, once or oftener, if necessary. Close valve 461 and open valve 710. When there are ten inches of vacuum on in container 60, which can be read on the gauge, close 710 and open 461 quickly. This waste is screened out at 804, Figure 8, and goes down the drainage line 805, Figure 4.

The high pressure may not be used in the initial operation because of the danger that the popped corn may be fractured by the turns in conduit 46. Popped corn will stand a certain amount of punishment before the oil has dried, but in general it will be safer to use the three inch vacuum and a gradual opening movement of valve 461 for the first movement of the bulk of the corn out of the popper 40.

With the popcorn in the chamber 60, dispenser 80 and vacuum 90 may be operated to bag the popcorn. If there is any delay in this, or if for any reason it is feared that the popcorn is cold, the opening of valve 564 will send heated air into the vacuum chamber 60 through conduit 565 which will rapidly heat the popcorn. If heating of the bagging compartment also is required, the main heating valve 564 may be closed and valves 569 and 571 may be opened to send the heat through the heating space 901 of the bagging compartment, then out through conduit 565 into the vacuum chamber.

With the corn in vacuum chamber 60, valve 461 may be opened to release whatever vacuum remains in vacuum chamber 60.

Bags may then be placed in the spaces of bagging turntable 911. The worm gear motor is then started and the worm 81 and bag carrier 911 operate simultaneously, the turntable having an edge to side friction grip on the large gear wheel shown in Figure 8. The worm moves corn to the dispensing spout 803 and agitating spring 607 assists the flow of corn into the worm housing 802.

The corn flows out of spout 803 to fill the rotating bags and if the quantity of corn in the vacuum chamber is sufficient the bags are filled.

Meanwhile, the kernels and partly popped kernels and any loose accumulations of salt, et cetera, fall through apertures 804 in the worm gear housing and are eliminated from the popcorn proceeding to the bags.

The worm and the turntable may then be stopped and the bags removed and sold immediately or stored in an oven (not shown).

Overflow in the bagging compartment is swept into channel 908 by the sweep flanges 907. This overflow is returned to the vacuum chamber 60 by creating a vacuum therein and opening feedback conduit valve 961 to suck the corn from channel 909 up conduit 96 and into the vacuum chamber.

Cleaning

The popper 40 and bagger 90 are manually cleaned by dismantling and individually cleaning. Means are provided for removing conduit 181 so the cover 403 can be removed.

Vacuum chamber 60 and dispenser 80 are cleaned by a vacuum splash system. The open lower end of conduit 559 is inserted in hot cleaning water with valve 560 connecting the conduit to the open end of conduit 559 which, through the conduits and valves already described, connects with open conduit 612 in dispensing chamber 60. A high degree of vacuum is created in the chamber 60 and then the vacuum line closed off. Valve 564 now controlling the connection between open-ended conduit 612 and the water supply is suddenly opened. The water rushes through the conduit and out the upwardly projecting end to splash against the roof and walls of the vacuum cylinder. The water drains out the hopper bottom 609 into the worm housing 802, through apertures 804 and into waste spout 805 carrying any grease or kernels with it. The cleaning cycle may, of course, be repeated as many times as necessary.

Hot air from conduit 555, in hot water tank 551, vacuum drawn is used for drying. It should be noted that when washing the vacuum chamber assembly the spout 803 must be closed with a tight fitting rubber plug (not shown) so that no water can get into the bagging compartment when the vacuum is broken by air following the water, which happens quickly. The water goes down the rear drain through the automatic valve.

In connection with the use of vacuum splash washing the bagging compartment must be provided with a safety valve (not shown) to avoid the development of a vacuum in bagging compartment if any or all of the valves 571, 564 and 569 are opened. The valve therefore prevents the development of a vacuum which would spring or cave the bagging compartment side.

Ingredients

With reference to the production of sixteen bags of popcorn in one batch for the turntable filling operation, it may be helpful to discuss the necessary ingredients and dimensions. These are not meant to be limiting but represent the inventor's empirical results.

One pound of popcorn will produce sixteen bags of the conventional 10¢ size, which is a one pound gusset bag 7½" x 3½" x 2".

The popping chamber for such a quantity of popcorn, should be about 960 cu. inches, that is 60 cu. inches per ounce.

With such a quantity of popcorn, 4 oz. of oil and 1½ oz. of salt are found to supply the necessary seasoning. The measuring components for the corn, oil and salt are, therefore, measured for these amounts and, as heretofore stated, this amount of popcorn requires a sixteen bag turntable.

Power supplies

The following power supplies have been found satisfactory:

| | Watts |
|---|---|
| Popper heating element 20–25 amps | 2000–2750 |
| ¼ H. P. motor for vacuum pump | 186 |
| ⅒ H. P. motor for worm turntable | 75 |
| Hot water heater element | 250 |
| Oven heater element | 300 |
| Lighting (not shown) | 220–300 |
| Total power watts | 3031–3861 |

What I claim as my own invention is:

Means for popping corn comprising a popping chamber, a corn kernel area at the bottom thereof, means for heating said corn kernel area, hot air heating means, means for guiding hot air produced thereby into and through the corn kernel area of said pot, a dispensing chamber, a conduit connecting said chambers, valve means for opening and closing said conduit and means for air evacuating to a desired degree the dispensing chamber.

References Cited in the file of this patent

UNITED STATES PATENTS

| | | |
|---|---|---|
| 505,126 | Powers | Sept. 19, 1893 |
| 904,186 | Eckstein | Nov. 17, 1908 |
| 1,104,990 | Harding | July 28, 1914 |
| 1,267,241 | McCaughey | May 21, 1918 |
| 1,587,386 | Lewis | June 1, 1926 |
| 2,312,730 | Ring | Mar. 2, 1943 |
| 2,357,820 | Hamilton | Sept. 17, 1944 |
| 2,549,449 | Gibson | Apr. 17, 1951 |
| 2,558,800 | Thompson et al. | July 3, 1951 |
| 2,559,522 | Sparacio | July 3, 1951 |
| 2,668,636 | Martin | Feb. 9, 1954 |
| 2,679,853 | Bryant | June 1, 1954 |
| 2,685,480 | Birch | Aug. 3, 1954 |